US011570866B2

(12) United States Patent
Peng

(10) Patent No.: US 11,570,866 B2
(45) Date of Patent: Jan. 31, 2023

(54) PIXEL-CONTROLLED LED LIGHT STRING AND METHOD OF OPERATING THE SAME

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 0 days.

(21) Appl. No.: 17/533,961

(22) Filed: Nov. 23, 2021

(65) Prior Publication Data

US 2022/0086986 A1    Mar. 17, 2022

Related U.S. Application Data

(60) Continuation-in-part of application No. 17/093,113, filed on Nov. 9, 2020, which is a continuation-in-part
(Continued)

(51) Int. Cl.
*H05B 45/40* (2020.01)
*H05B 45/44* (2020.01)
(Continued)

(52) U.S. Cl.
CPC .......... *H05B 45/40* (2020.01); *H05B 47/175* (2020.01); *H05B 47/19* (2020.01);
(Continued)

(58) Field of Classification Search
CPC ........ H05B 45/00; H05B 45/10; H05B 45/20; H05B 45/40; H05B 45/44; H05B 47/10;
(Continued)

(56) References Cited

U.S. PATENT DOCUMENTS 6,119,255 A    9/2000  Akram
7,015,825 B2   3/2006  Callahan
(Continued)

FOREIGN PATENT DOCUMENTS

CN    101494936 A    7/2009
CN    101603648 A    12/2009
(Continued)

OTHER PUBLICATIONS

Office Action issued in corresponding TW patent application No. 108126417 dated May 6, 2020, 10 pages.
(Continued)

*Primary Examiner* — Thai Pham
(74) *Attorney, Agent, or Firm* — Muncy, Geissler, Olds & Lowe, P.C.

(57) ABSTRACT

A pixel-controlled LED light includes a plurality of LED modules and a controller. Each LED module includes at least one LED and a LED drive apparatus. The LED drive apparatus burns an ordinal number according to connection sequence thereof. The controller defines the ordinal number of the LED module as a target number, and sequentially transmits a plurality of light data whose number is greater than or equal to the target number to each of the LED modules. Each of the LED drive apparatuses sequentially receives each of the light data and counts sequence of the light data. If the sequence of the light data is equal to the ordinal number of the LED drive apparatus, the LED drive apparatuses identify the light data, and after identifying the light data, the LED drive apparatuses control the corresponding at least one LED.

20 Claims, 9 Drawing Sheets

Related U.S. Application Data of application No. 16/543,971, filed on Aug. 19, 2019, now Pat. No. 10,874,010, which is a continuation-in-part of application No. 16/237,045, filed on Dec. 31, 2018, now Pat. No. 10,462,866, which is a division of application No. 15/629,014, filed on Jun. 21, 2017, now Pat. No. 10,231,303, which is a continuation-in-part of application No. 14/521,118, filed on Oct. 22, 2014, now Pat. No. 9,930,734.

(51) Int. Cl.
| | |
|---|---|
| *G09G 3/32* | (2016.01) |
| *H05B 47/19* | (2020.01) |
| *H05B 47/175* | (2020.01) |
| *H05B 45/10* | (2020.01) |
| *H04L 61/5038* | (2022.01) |
| *H04L 61/5046* | (2022.01) |

(52) U.S. Cl.
CPC ...... *H04L 61/5038* (2022.05); *H04L 61/5046* (2022.05); *H05B 45/10* (2020.01)

(58) Field of Classification Search
CPC ...... H05B 47/175; H05B 47/19; H05B 45/32; G09G 3/32; G09G 3/3258; G09G 2310/0213; G09G 2300/0814; G09G 2310/0264
See application file for complete search history.

(56) References Cited

U.S. PATENT DOCUMENTS

| | | | |
|---|---|---|---|
| 7,412,530 B1 | 8/2008 | Wehrle et al. | |
| 8,716,950 B2 * | 5/2014 | Peting | H02M 3/155 323/305 |
| 9,173,259 B1 | 10/2015 | Peng | |
| 2002/0145394 A1 | 10/2002 | Morgan et al. | |
| 2002/0145494 A1 | 10/2002 | Morgan et al. | |
| 2003/0188202 A1 | 10/2003 | D'Angelo et al. | |
| 2004/0174570 A1 * | 9/2004 | Plunkett | H04N 1/405 358/3.13 |
| 2005/0231134 A1 * | 10/2005 | Sid | H05B 47/195 315/308 |
| 2007/0046590 A1 | 3/2007 | Umezaki et al. | |
| 2007/0159422 A1 | 7/2007 | Blandino et al. | |
| 2009/0244043 A1 | 10/2009 | Kasai et al. | |
| 2009/0289578 A1 | 11/2009 | Peng | |
| 2011/0096099 A1 | 4/2011 | Yamamoto et al. | |
| 2011/0101889 A1 * | 5/2011 | Lys | H05B 45/30 315/312 |
| 2011/0193484 A1 | 8/2011 | Harbers et al. | |
| 2011/0266976 A1 | 11/2011 | Zhang et al. | |
| 2011/0285515 A1 | 11/2011 | Fushimi et al. | |
| 2012/0098446 A1 * | 4/2012 | Kim | H05B 47/19 315/193 |
| 2013/0147370 A1 | 6/2013 | Williams et al. | |
| 2013/0169178 A1 | 7/2013 | Peng | |
| 2014/0265880 A1 | 9/2014 | Taipale et al. | |
| 2014/0270797 A1 | 9/2014 | Pederson | |
| 2015/0208485 A1 * | 7/2015 | Nakamura | H05B 47/18 315/291 |
| 2015/0245435 A1 | 8/2015 | Peng | |
| 2015/0282282 A1 | 10/2015 | Breuer et al. | |
| 2015/0289330 A1 | 10/2015 | Peng | |
| 2015/0341994 A1 * | 11/2015 | Wang | H05B 47/185 315/185 R |
| 2017/0004753 A1 | 1/2017 | Kim et al. | |
| 2018/0035501 A1 | 2/2018 | Motomura et al. | |

FOREIGN PATENT DOCUMENTS

| | | |
|---|---|---|
| CN | 101636023 A | 1/2010 |
| CN | 101702848 A | 5/2010 |
| CN | 201521844 U | 7/2010 |
| CN | 202496103 U | 10/2012 |
| CN | 203788523 U | 8/2014 |
| TW | I396411 B | 5/2013 |
| TW | I463329 B | 12/2014 |
| TW | I496507 B | 8/2015 |
| TW | I639359 B | 10/2018 |
| WO | WO 2008/048516 A2 | 4/2008 |

OTHER PUBLICATIONS

CN Office Action, patent application No. 201910720899.7, dated Aug. 19, 2022.

* cited by examiner

PIXEL-CONTROLLED LED LIGHT STRING AND METHOD OF OPERATING THE SAME

CROSS REFERENCE TO RELATED APPLICATIONS

This application is a Continuation-in-Part application of U.S. patent application Ser. No. 17/093,113 filed Nov. 9, 2020, which is a Continuation-in-Part application of U.S. patent application Ser. No. 16/543,971, filed on Aug. 19, 2019, now U.S. Pat. No. 10,874,010B2 issued Dec. 22, 2020, which is a continuation-in-part application of U.S. patent application Ser. No. 16/237,045, filed on Dec. 31, 2018, now U.S. Pat. No. 10,462,866B2 issued Oct. 29, 2019, which is a divisional application of U.S. patent application Ser. No. 15/629,014, filed on Jun. 21, 2017, now U.S. Pat. No. 10,231,303B2, issued Mar. 12, 2019, which is a continuation-in-part of U.S. patent application Ser. No. 14/521,118, filed on Oct. 22, 2014, now U.S. Pat. No. 9,930,734B2, issued Mar. 27, 2018. The entire contents of which are hereby incorporated by reference.

BACKGROUND

Technical Field

The present disclosure relates to a LED light and a method of operating the same, and more particularly to a pixel-controlled LED light string and a method of operating the same.

Description of Related Art

The statements in this section merely provide background information related to the present disclosure and do not necessarily constitute prior art.

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

Take the festive light for example. Basically, a complete LED lamp includes an LED light string having a plurality of LEDs and a drive unit for driving the LEDs. The drive unit is electrically connected to the LED light string, and controls the LEDs by a pixel control manner or a synchronous manner by providing the required power and the control signal having light data to the LEDs, thereby implementing various lighting output effects and changes of the LED lamp.

In the current technology, in order to drive the LEDs of the LED string variously lighting, the LEDs have different address sequence data. The LEDs receive light signals involving light data and address data. If the address sequence data of the LEDs are the same as the address data of the light signals, the LEDs light according to the light data of the light signals. If the address sequence data of the LEDs are different from the address data of the light signals, the LEDs skip the light data of the light signals.

At present, the methods of sequencing the LEDs of the LED string are mostly complicated and difficult. For example, before the LEDs are assembled into the LED string, different address sequence data need to be burned for each of the LEDs. Thereafter, the LEDs are sequentially placed and assembled into the LED string according to the address sequence data. If the LEDs are not sequentially assembled in accordance with the address sequence data, the diverse illumination of the LEDs cannot be correctly achieved.

SUMMARY

An object of the present disclosure is to provide a pixel-controlled LED light string to solve the above-mentioned problems.

In order to achieve the above-mentioned object, the pixel-controlled LED light string includes a plurality of LED modules and a controller. The plurality of LED modules is electrically connected to each other. Each LED module includes at least one LED and a LED drive apparatus with burning function. The LED drive apparatus is coupled to the at least one LED and the LED drive apparatus burns an ordinal number according to connection sequence of the LED drive apparatus. The controller is electrically connected to the LED modules. The controller defines the ordinal number of the LED module as a target number for charging a light mode of the LED module, and sequentially transmits a plurality of light data whose number is greater than or equal to the target number to each of the LED modules. Each of the LED drive apparatuses sequentially receives each of the light data and counts sequence of the light data, if the sequence of the light data is equal to the ordinal number of the LED drive apparatus, the LED drive apparatuses identify the light data, and after identifying the light data, the LED drive apparatuses control the corresponding at least one LED; wherein the light data includes a plurality of first level voltage signals and a plurality of second level voltage signals; when the LED drive apparatus receives the light data, the LED drive apparatus is configured to calculate a first time length of the first level voltage signal and a second time length of the second level voltage signal; wherein the LED drive apparatus is configured to identify the first level voltage signal as a first value if the first time length is greater than a first predefined time length, and as a second value if the first time length is less than or equal to the first predefined time length; wherein the LED drive apparatus is configured to identify the second level voltage signal as the first value if the second time length is greater than a second predefined time length, and as the second value if the second time length is less than or equal to the second predefined time length.

In one embodiment, each LED module includes a positive power end and a negative power end, and a data signal end. The data signal ends of the plurality of LED modules receive the plurality of light data. The positive power ends of the plurality of LED modules are connected to each other and receive a positive power provided from the controller. The negative power ends of the plurality of LED modules are connected to each other and receive a negative power provided from the controller.

In one embodiment, each LED module includes a positive power end and a negative power end, and a data signal end. The data signal ends of the plurality of LED modules receive the plurality of light data. The positive power end of the first LED module receives a positive power provided from the controller and the negative power end of the last LED module receives a negative power provided from the controller, and the remaining LED modules are coupled in series by connecting the positive power end of the latter to the negative power end of the former.

In one embodiment, the controller is configured to generate a working voltage and transmit the light data to each of the LED modules by changing magnitude of the working voltage.

In one embodiment, the controller is configured to control a voltage drop of the working voltage to be less than a low-level voltage and transmit the light data to the LED modules.

In one embodiment, the number of the light data is equal to the number of the LED modules.

In one embodiment, the number of the light data is equal to the maximum ordinal number of the LED modules that need to be changed their light modes.

In one embodiment, the LED modules that need to be changed their light modes are configured to receive different light data, the same light data, or a specific light data.

In one embodiment, the light data has an end code or has a start code and an end code; each of the LED drive apparatuses is burned by a contact burning or a non-contact burning; the first predefined time length is equal to the second predefined time length.

In one embodiment, the LED drive apparatus includes: a signal detector; an ordinal signal generator electrically connected to the signal detector; a data generator electrically connected to the signal detector; a bit counter electrically connected to the ordinal signal generator; a comparator electrically connected to the bit counter; an AND gate electrically connected to the comparator and the data generator; a register electrically connected to the AND gate; and a plurality of buffers electrically connected to the register and the at least one LED.

Accordingly, the pixel-controlled LED light string is provided to realize the burning manner without address data only by counting the ordinal number to acquire the light data so that the LEDs of the LED modules can be also correctly controlled.

Another object of the present disclosure is to provide a method of operating a pixel-controlled LED light string to solve the above-mentioned problems.

In order to achieve the above-mentioned object, the method of operating the pixel-controlled LED light string is provided. The pixel-controlled LED light includes a plurality of LED modules and a controller. Each LED module includes at least one LED and a LED drive apparatus with burning function, and the LED drive apparatus burns an ordinal number according to connection sequence of the LED drive apparatus. The method includes the steps of: defining, by the controller, the ordinal number of the LED modules as a target number for changing a light mode of the LED module, and sequentially transmitting a plurality of light data whose number is greater than or equal to the target number to each of the LED modules, sequentially receiving, by the LED drive apparatuses, each of the light data and counting sequence of the light data, identifying, by the LED drive apparatuses, the light data if the sequence of the light data is equal to the ordinal number of the LED drive apparatus, and controlling, by the LED drive apparatuses, the corresponding at least one LED, wherein the light data includes a plurality of first level voltage signals and a plurality of second level voltage signals; when the LED drive apparatus receives the light data, the LED drive apparatus is configured to calculate a first time length of the first level voltage signal and a second time length of the second level voltage signal; wherein the LED drive apparatus is configured to identify the first level voltage signal as a first value if the first time length is greater than a first predefined time length, and as a second value if the first time length is less than or equal to the first predefined time length; wherein the LED drive apparatus is configured to identify the second level voltage signal as the first value if the second time length is greater than a second predefined time length, and as the second value if the second time length is less than or equal to the second predefined time length.

In one embodiment, each LED module includes a positive power end and a negative power end, and a data signal end. The data signal ends of the plurality of LED modules receive the plurality of light data. The positive power ends of the plurality of LED modules are connected to each other and receive a positive power provided from the controller. The negative power ends of the plurality of LED modules are connected to each other and receive a negative power provided from the controller.

In one embodiment, each LED module includes a positive power end and a negative power end, and a data signal end. The data signal ends of the plurality of LED modules receive the plurality of light data. The positive power end of the first LED module receives a positive power provided from the controller and the negative power end of the last LED module receives a negative power provided from the controller, and the remaining LED modules are coupled in series by connecting the positive power end of the latter to the negative power end of the former.

In one embodiment, the controller is configured to generate a working voltage and transmit the light data to each of the LED modules by changing magnitude of the working voltage.

In one embodiment, the controller is configured to control a voltage drop of the working voltage to be less than a low-level voltage and transmit the light data to the LED modules.

In one embodiment, the number of the light data is equal to the number of the LED modules.

In one embodiment, the number of the light data is equal to the maximum ordinal number of the LED modules that need to be changed their light modes.

In one embodiment, the LED modules that need to be changed their light modes are configured to receive different light data, the same light data, or a specific light data.

In one embodiment, the light data has an end code or has a start code and an end code; each of the LED drive apparatuses is burned by a contact burning or a non-contact burning; the first predefined time length is equal to the second predefined time length.

In one embodiment, the LED drive apparatus includes: a signal detector; an ordinal signal generator electrically connected to the signal detector; a data generator electrically connected to the signal detector; a bit counter electrically connected to the ordinal signal generator; a comparator electrically connected to the bit counter; an AND gate electrically connected to the comparator and the data generator; a register electrically connected to the AND gate; and a plurality of buffers electrically connected to the register and the at least one LED.

Accordingly, the method of controlling the pixel-controlled LED light string is provided to realize the burning manner without address data only by counting the ordinal number to acquire the light data so that the LEDs of the LED modules can be also correctly controlled.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWING

The present disclosure can be more fully understood by reading the following detailed description of the embodiment, with reference made to the accompanying drawings as follows.

DETAILED DESCRIPTION

Figure 1:
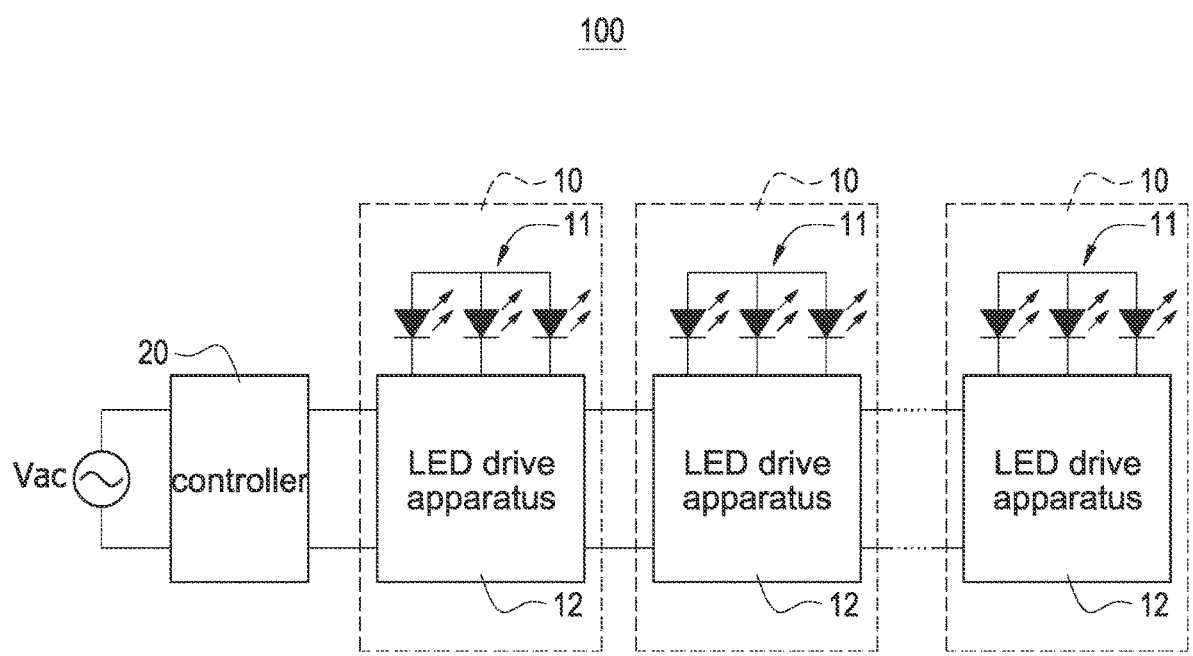
FIG. 1 is a schematic block diagram of a pixel-controlled LED light string according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a schematic block diagram of a pixel-controlled LED light string according to the present disclosure. The pixel-controlled LED light string 100 is a two-wire structure, and the pixel-controlled LED light string 100 includes a plurality of LED modules 10 and a controller 20. The LED modules 10 are electrically connected to each other. The controller 20 includes a power conversion circuit (not shown) and a control circuit (not shown), i.e., the power conversion circuit and the control circuit may be integrated into the controller 20. Specifically, the controller 20 may be implemented by a physical circuit control box including the power conversion circuit and the control circuit. The power conversion circuit receives an AC power source Vac and converts the AC power source Vac into a DC power source. The control circuit receives the DC power source to supply the required DC power for the control circuit and the pixel-controlled LED light string 100.

Each of the LED modules 10 includes at least one LED 11 and a LED drive apparatus with burning function 12 (hereinafter referred to as LED drive apparatus 12). Each LED module 10 shown in FIG. 1 has three LEDs 11 involving three primary colors of red (R), green (G), and blue (B). The LED drive apparatus 12 is coupled to the at least one LED 11 and the LED drive apparatus 12 burns an ordinal number according to connection sequence thereof, and the detailed description will be made hereinafter. In one embodiment, each of the LED modules 10 is a LED module having data burning function, and therefore each of the LED modules 10 has own digital and analog circuits for burning light data and sequence (ordinal number) data.

The control circuit of the controller 20 can receive external light control data through a wired manner or a wireless manner as well as read internal light data stored inside the control circuit so that the control circuit can control each of the LED modules 10 of the pixel-controlled LED light string 100 according to the content of the light control data. For example, the user may operate a computer through the wired manner to transmit the light control data to the control circuit so that the control circuit controls the LED modules 10 according to the light control data. Alternatively, the user may operate a mobile phone or a wearable device through the wireless manner to transmit the light control data to the control circuit so that the control circuit controls the LED modules 10 according to the light control data. However, the present disclosure is not limited by the above-mentioned manners of transmitting the light control data and the devices operated by the user.

Figure 2A:
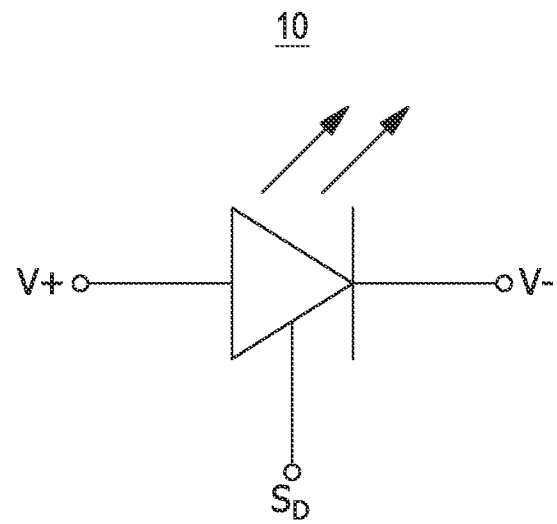
FIG. 2A is a schematic view of a three-wire LED module according to the present disclosure.

Please refer to FIG. 2A, which shows a three-wire LED module 10 according to the present disclosure. As shown in FIG. 2A, the three-wire LED module 10 has three ends, including a positive power end V+, a negative power end V−, and a data signal end $S_D$.

Figure 2B:
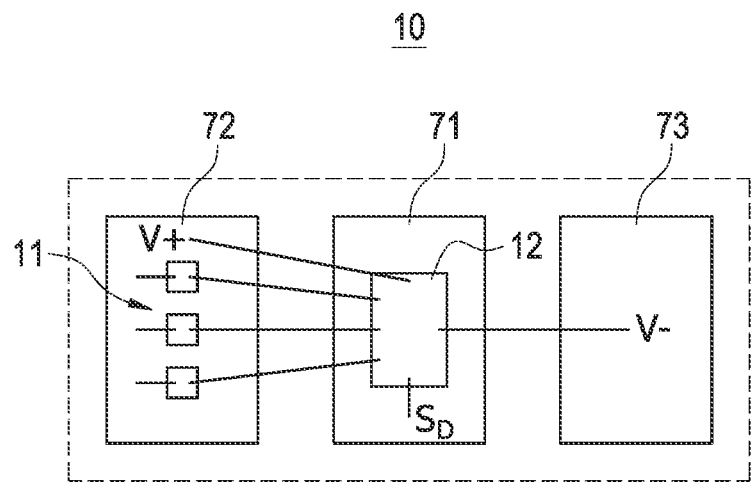
FIG. 2B is a schematic top view of a package structure of the three-wire LED module according to the present disclosure.

Please refer to FIG. 2B, which shows a schematic top view of a package structure of the three-wire LED module according to the present disclosure. The LED drive apparatus 12 is disposed/mounted on a first plate 71, such as but not limited to a welding plate, and the three LEDs 11 are disposed/mounted on a second plate 72 (not labeled). The three LEDs 11 are electrically connected to the LED drive apparatus 12 by a wire bonding manner. In this embodiment, the data signal end $S_D$ is provided from the first plate 71, the positive power end V+ is provided from the second plate 72, and the negative power end V− is provided from a third plate 73, thereby forming the LED module 10 with the three-wire structure. However, the positions of the positive power end V+, the negative power end V−, and the data signal end $S_D$ are not limited as shown in FIG. 2B, that is, the positive power end V+ may be provided from the third plate 73 and the negative power end V− may be provided from the second plate 72.

Figure 3A:
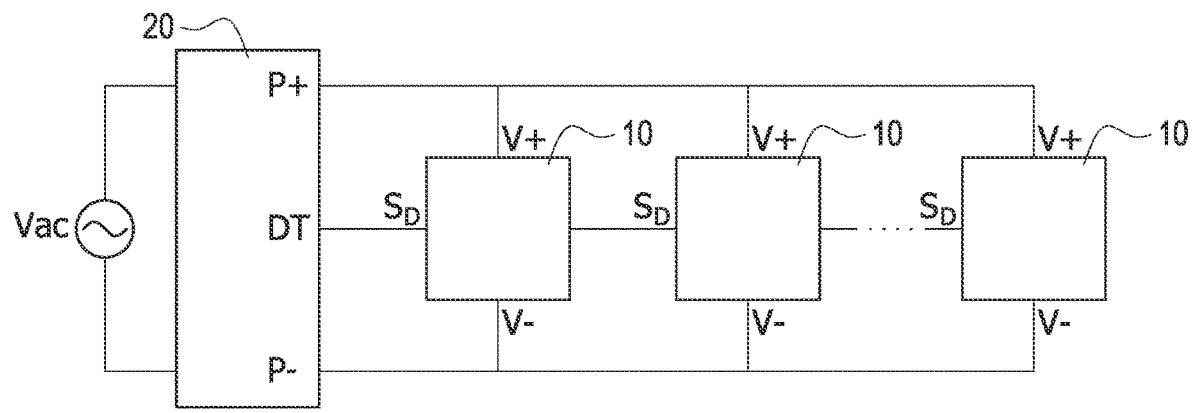
FIG. 3A is a block circuit diagram of a plurality of three-wire LED modules coupled in parallel according to the present disclosure.

Please refer to FIG. 3A, which shows a block circuit diagram of a plurality of three-wire LED modules coupled in parallel according to the present disclosure. As mentioned above, the controller 20 receives the AC power source Vac and converts the AC power source Vac into the DC power source. The positive output of the DC power source is provided from a positive power end P+ of the controller 20 and the negative output of the DC power source is provided from a negative power end P− of the controller 20. Further, the controller 20 provides/transmits a plurality of light data (which may be also called "light mode data" in the present disclosure) from a data end DT. In the parallel-connected structure, these positive power ends V+ of the plurality of LED modules 10 are coupled to the positive power end P+ of the controller 20, these negative power ends V− of the plurality of LED modules 10 are coupled to the negative power end P− of the controller 20, and these data signal ends $S_D$ of the plurality of LED modules 10 are coupled to the data end DT of the controller 20 and receive the plurality of light data provided from the controller 20 through the data end DT.

Figure 3B:
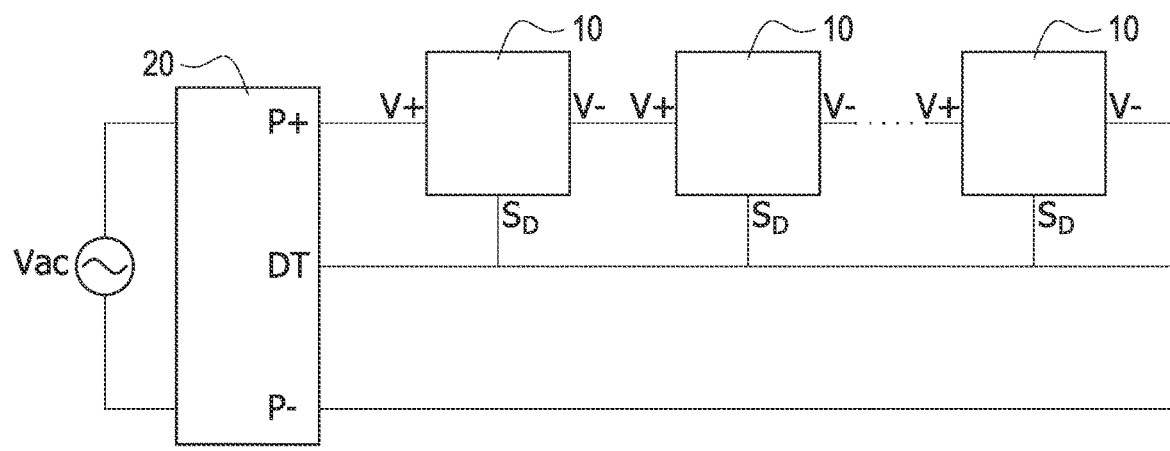
FIG. 3B is a block circuit diagram of a plurality of three-wire LED modules coupled in series according to the present disclosure.

Please refer to FIG. 3B, which shows a block circuit diagram of a plurality of three-wire LED modules coupled in series according to the present disclosure. In the series-connected structure, these data signal ends $S_D$ of the plurality of LED modules 10 are coupled to the data end DT of the controller 20 and receive the plurality of light data provided from the controller 20 through the data end DT. The positive power end V+ of the first LED module 10 is coupled to the positive power end P+ of the controller 20, the negative end V− of the last LED module 10 is coupled to the negative power end P− of the controller 20, and the remaining LED modules 10 are coupled in series by connecting the positive power end V+ of the latter to the negative power end V− of the former.

The LED modules have physical electrical connections when the LED modules 10 are assembled, but the LED modules 10 have not been numbered. Therefore, the LED drive apparatuses 12 with burning function are used to burn the ordinal number to number the LED modules 10 so that the sequence of the LED modules 10 of the assembled pixel-controlled LED light string 100 is clearly defined. For example, it is assumed that the number of the LED modules 10 is 50 and the 50 LED modules 10 are connected in series. Therefore, the ordinal number of the LED drive apparatus 12 of the 1st LED module 10 is 1, the ordinal number of the LED drive apparatus 12 of the 2nd LED module 10 is 2, and so on. Finally, the ordinal number of the LED drive apparatus 12 of the 50th LED module 10 is 50. Accordingly, each LED module 10 has its own unique identification ordinal number after the ordinal numbers of the LED modules 10 are defined. Specifically, each of the LED drive apparatuses 12 can be burned by a contact burning or a non-contact burning.

Afterward, the controller 20 defines the ordinal number of the LED modules 10 which need to be changed their light modes as a target number, and sequentially transmits light data whose number is greater than or equal to the target number to each of the LED modules 10. For convenience of explanation, the following description will be made by taking examples.

In the present disclosure, there are two specific embodiments, which are respectively described below.

The first embodiment: the controller 20 sequentially transmits a plurality of light data whose number is greater than the target number to each of the LED modules 10 such as that the controller 20 sequentially transmits the plurality of light data whose number is equal to the number of the LED modules 10. For example, it is assumed that the number of the LED modules 10 is 50, and the controller 20 sequentially transmits the plurality of light data whose number is 50. Moreover, it is assumed that the LEDs 11 in the 35th LED module 10 need to be changed their light modes from a light mode A (for example, it is continuously bright) to a light mode B (for example, it is flickering), and therefore the target number is 35. Therefore, the controller 20 transmits the light data whose number is 50 (that is greater than the target number=35) at once. As shown in table 1, the first row of the table 1 shows the ordinal number of the LED drive apparatus 12, i.e., the sequence of the LED modules 10 and the sequence of the light data. The second row of the table 1 shows the light data before change of the LEDs 11, in which "A" represents the light mode A, "B" represents the light mode B, and so on. The third row of the table 1 shows the light data after change of the LEDs 11.

The LED drive apparatuses 12 sequentially receive the light data for counting, i.e., each of the LED drive apparatus 12 sequentially receives each of the light data and counts sequence of the light data. If the sequence of the light data meets (is equal to) the ordinal number of the LED drive apparatus 12, the LED drive apparatuses 12 identify the light data. After identifying the light data, the LED drive apparatuses 12 control the corresponding LEDs 11.

If the sequence of the light data is 1 and the corresponding light mode A is transmitted to the 1st LED module 10 (i.e., the ordinal number is 1), the 1st LED drive apparatus 12 identifies the light data since the sequence of the light data meets (is equal to) the ordinal number (=1) of the 1st LED drive apparatus 12. At this condition, the light mode A is identified, and then the 1st LED drive apparatus 12 controls the LEDs 11 of the 1st LED module 10 to work according to the light mode A.

Afterward, the sequence of the light data is 1 and the corresponding light mode A is transmitted to the 2nd LED module 10, and the sequence of the light data is 2 and the corresponding light mode B is transmitted to the 1st LED module 10. For the 2nd LED module 10, the 2nd LED drive apparatus 12 does not identify the light data and does not control the LEDs 11 of the 2nd LED module 10 since the sequence (=1) of the light data does not meet (is not equal to) the ordinal number (=2) of the 2nd LED drive apparatus 12. Simultaneously, for the 1st LED module 10, the 1st LED drive apparatus 12 does not identify the light data and does not control the LEDs 11 of the 1st LED module 10 since the sequence (=2) of the light data does not meet (is not equal to) the ordinal number (=1) of the 1st LED drive apparatus 12.

Afterward, the sequence of the light data is 1 and the corresponding light mode A is transmitted to the 3rd LED module 10, the sequence of the light data is 2 and the corresponding light mode B is transmitted to the 2nd LED module 10, and the sequence of the light data is 3 and the corresponding light mode A is transmitted to the 1st LED module 10. For the 3rd LED module 10, the 3rd LED drive apparatus 12 does not identify the light data and does not control the LEDs 11 of the 3rd LED module 10 since the sequence (=1) of the light data does not meet (is not equal to) the ordinal number (=3) of the 3rd LED drive apparatus 12. Simultaneously, for the 2nd LED module 10, the 2nd LED drive apparatus 12 identifies the light data since the sequence of the light data meets (is equal to) the ordinal number (=2) of the 2nd LED drive apparatus 12. At this condition, the light mode B is identified, and then the 2nd LED drive apparatus 12 controls the LEDs 11 of the 2nd LED module 10 to work according to the light mode B. Simultaneously, for the 1st LED module 10, the 1st LED drive apparatus 12 does not identify the light data and does not control the LEDs 11 of the 1st LED module 10 since the sequence (=3) of the light data does not meet (is not equal to) the ordinal number (=1) of the 1st LED drive apparatus 12.

As described above, only the first three LED modules 10 are described as examples for dynamic transmission of the light data, reception, and recognition of each of the LED drive apparatuses 12, and control of the LEDs 11. The operation of the subsequent LED modules 10 is the same as that of the first three LED modules 10 and the detail description is omitted here for conciseness. Accordingly, the corresponding LEDs 11 are controlled to work according to the light data when the sequence of the light data meets the ordinal number of the LED drive apparatuses 12.

TABLE 1

| sequence of the light data | 1 | 2 | 3 | 4 | ... | 35 | ... | 48 | 49 | 50 |
|---|---|---|---|---|---|---|---|---|---|---|
| the light data before change | A | B | A | C | ... | A | ... | B | A | C |

TABLE 1-continued

| sequence of the light data | 1 | 2 | 3 | 4 | ... | 35 | ... | 48 | 49 | 50 |
|---|---|---|---|---|---|---|---|---|---|---|
| the light data after change | A | B | A | C | ... | B | ... | B | A | C |

Moreover, it is assumed that the LEDs 11 in the 35th LED module 10 need to be changed their light modes, and therefore the LED drive apparatus 12 of the 35th LED module 10 receives different light data. For example, the LED drive apparatus 12 of the 35th LED module 10 having the ordinal number of 35 receives the light data after change that is B (the light data before change that is A). Also, the LEDs 11 in the LED modules 10 which do not need to be changed their light modes receive the same light data. For example, except the 35th LED module 10, other LED modules 10 receive the same light data as the light data before change. Accordingly, through the persistence of vision, the phenomenon seen by the human is that the light mode of the 1st to 34th LED modules 10 and the light mode of the 36th to 50th LED modules 10 have not changed, but the light mode of the 35th LED module 10 has changed (for example, from continuously bright to flickering). In particular, the light data received by the LED module 10 may be stored in a register or a memory thereof.

Accordingly, the burning manner without address data can be realized, and the LEDs 11 of the LED modules 10 can be also correctly controlled.

In addition, the light data has an end code or has a start code and an end code as a mark for determining the end or start of the light data. As shown in table 2 and table 3, they are examples of adding the end code and adding the start code and the end code respectively to table 1.

TABLE 2

| sequence of the light data | 1 | 2 | 3 | 4 | ... | 35 | ... | 48 | 49 | 50 | |
|---|---|---|---|---|---|---|---|---|---|---|---|
| the light data before change | A | B | A | C | ... | A | ... | B | A | C | Z |
| the light data after change | A | B | A | C | ... | B | ... | B | A | C | Z |

As shown in table 2, the end code is, for example but not limited to, represented by "Z", and it can also be represented by other symbols or numbers that are sufficiently separated. When the "Z" of the light data is transmitted from the controller 20, it indicates that all the number of the light data have been completely transmitted. Until the next time that the LEDs 11 need to change their light modes, the controller 20 will transmit new light data again.

TABLE 3

| sequence of the light data | | 1 | 2 | 3 | 4 | ... | 35 | ... | 48 | 49 | 50 | |
|---|---|---|---|---|---|---|---|---|---|---|---|---|
| the light data before change | X | A | B | A | C | ... | A | ... | B | A | C | Z |
| the light data after change | X | A | B | A | C | ... | B | ... | B | A | C | Z |

As shown in table 3, the start code is, for example but not limited to, represented by "X" and the end code is, for example but not limited to, represented by "Z", and they can also be represented by other symbols or numbers that are sufficiently separated. When the "X" of the light data is transmitted from the controller 20, it indicates that the 1st light data will be transmitted next the start code. When the "Z" of the light data is transmitted from the controller 20, it indicates that all the number of the light data have been completely transmitted. Until the next time that the LEDs 11 need to change their light modes, the controller 20 will transmit new light data again.

Moreover, if two or more LED modules 10 need to be simultaneously changed their light modes, for example the 4th, 35th, and 48th LED modules 10 need to be simultaneously changed their light modes, the controller 20 transmits the light data with different light modes to the 4th LED module 10 (for example from light mode C to light mode D), to the 35th LED module 10 (for example from light mode A to light mode B), and to the 48th LED module 10 (for example from light mode B to light mode C). Also, the controller 20 transmits the light data with the same light mode to other LED modules 10. Therefore, the effect of changing the light mode of the plurality of LED modules 10 can be realized, as shown in table 4.

TABLE 4

| sequence of the light data | | 1 | 2 | 3 | 4 | ... | 35 | ... | 48 | 49 | 50 | |
|---|---|---|---|---|---|---|---|---|---|---|---|---|
| the light data before change | X | A | B | A | C | ... | A | ... | B | A | C | Z |
| the light data after change | X | A | B | A | D | ... | B | ... | C | A | C | Z |

Moreover, if the LEDs 11 in the 35th LED module 10 need to be changed their light modes, and therefore the LED drive apparatus 12 of the 35th LED module 10 receives different light data. For example, the LED drive apparatus 12 of the 35th LED module 10 having the ordinal number of 35 receives the light data after change that is B (the light data before change that is A). Also, the LEDs 11 in the LED modules 10 which do not need to be changed their light modes receive the specific light data, for example but not limited to "R". Therefore, as long as the specific light data is recognized, it means that the LED modules 10 that receive the specific light data do not change their light modes, as shown in table 5.

TABLE 5

| sequence of the light data | 1 | 2 | 3 | 4 | ... | 35 | ... | 48 | 49 | 50 | |
|---|---|---|---|---|---|---|---|---|---|---|---|
| the light data before change | A | B | A | C | ... | A | ... | B | A | C | Z |
| the light data after change | R | R | R | R | ... | B | ... | R | R | R | Z |

The second embodiment: the controller 20 sequentially transmits a plurality of light data whose number is equal to the target number to each of the LED modules 10 such as that the controller 20 sequentially transmits the plurality of light data whose number is the maximum ordinal number of the LED modules 10 that need to be changed their light modes. In this embodiment, the end code or the start code and the end code involved in the light data mode are similar to the first embodiment (as shown in table 2 and table 3), different light data received by the LED modules which need to change their light modes and the same light data received by the LED modules which do not need to change their light modes are similar to the first embodiment (as shown in table 1 to table 4), and different light data received by the LED modules which need to change their light modes and the specific light data received by the LED modules which do not need to change their light modes are similar to the first embodiment (as shown in table 5). Therefore, the same technical features as the foregoing first embodiment will not be described herein.

If the LEDs 11 in the 4th LED module 10 need to be changed their light modes, the controller 20 transmits the light data whose number is 4 (that is equal to the target number=4, if the start code "X" and the end code "Z" are not involved) at once as shown in table 6. Since the maximum ordinal number of the LEDs 11 in the LED module 10 that need to be changed their light modes is 4, the controller 20 only transmits the light data whose number is 4 and further the end code "Z" as the mark for determining the end of the light data. In other words, it is not necessary to transmit the same or specific light data to the LED modules 10 which do not need to be changed their light modes after the 4th LED module 10 so that the data amount of the light data can be reduced.

TABLE 6

| sequence of the light data | 1 | 2 | 3 | 4 | ... | 35 | ... | 48 | 49 | 50 |
|---|---|---|---|---|---|---|---|---|---|---|
| the light data before change | X | A | B | A | C | ... | A | ... | B | A | C | Z |
| the light data after change | X | A | B | A | D | Z | | | | | |

Moreover, if two or more LED modules 10 need to be simultaneously changed their light modes, for example the 4th and 35th LED modules 10 need to be simultaneously changed their light modes, the controller 20 transmits the light data whose number is 35 (that is equal to the target number=35, if the start code "X" and the end code "Z" are not involved) at once as shown in table 7. Since the maximum ordinal number of the LEDs 11 in the LED module 10 that need to be changed their light modes is 35, the controller 20 only transmits the light data whose number is 35 and further the end code "Z" as the mark for determining the end of the light data. In other words, it is not necessary to transmit the same or specific light data to the LED modules 10 which do not need to be changed their light modes after the 35th LED module 10 so that the data amount of the light data can be reduced. Accordingly, the burning manner without address data can be realized, and the LEDs 11 of the LED modules 10 can be also correctly controlled.

TABLE 7

| sequence of the light data | 1 | 2 | 3 | 4 | ... | 35 | ... | 48 | 49 | 50 |
|---|---|---|---|---|---|---|---|---|---|---|
| the light data before change | X | A | B | A | C | ... | A | ... | B | A | C | Z |
| the light data after change | X | A | B | A | D | ... | B | Z | | | |

Figure 4A:
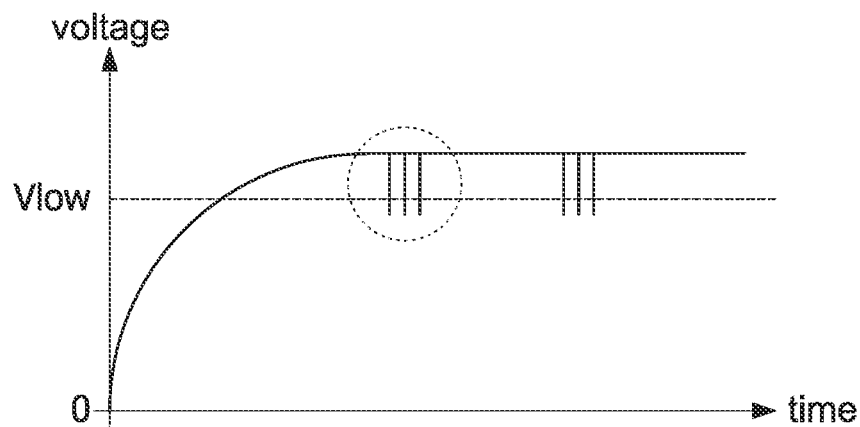
FIG. 4A is a schematic waveform of a working voltage for the pixel-controlled LED light string according to the present disclosure.
Figure 4B:
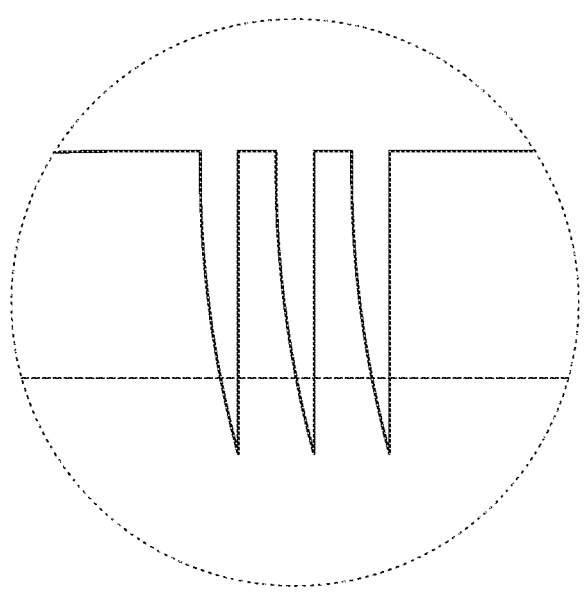
FIG. 4B is a partial enlarged view of FIG. 4A.

Please refer to FIG. 4A, which shows a schematic waveform of a working voltage for the pixel-controlled LED light string according to the present disclosure. Also, FIG. 4B is a partial enlarged view of FIG. 4A. The two-wire pixel-controlled LED light string 100 is controlled through a working voltage generated by controlling an output control switch (not shown) by a controller. As shown in FIG. 4A, when the working voltage is lower than an identifiable low-level voltage Vlow, the working voltage is as an effective voltage for controlling the LED modules 10. Further, a set of voltage with a plurality of effective control voltages are generated to control light data of the LED module 10. Therefore, multiple sets of voltages are transmitted by the controller 20 to control light data of the LED modules 10.

Figure 5:
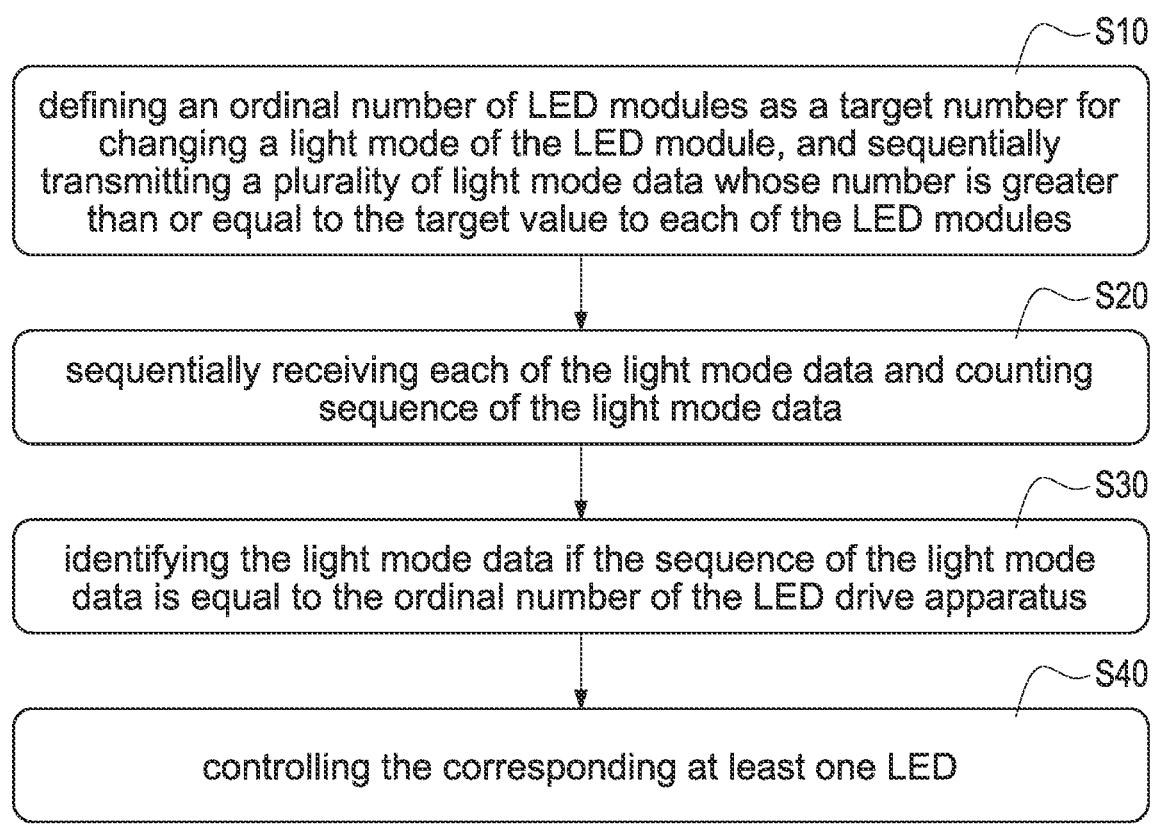
FIG. 5 is a flowchart of a method of operating the pixel-controlled LED light string according to the present disclosure.

Please refer to FIG. 5, which shows a flowchart of a method of operating the pixel-controlled LED light string according to the present disclosure. The pixel-controlled LED light includes a plurality of LED modules 10 and a controller 20. Each of the LED modules 10 includes at least one LED 11 and a LED drive apparatus with burning function 12. The LED drive apparatus 12 burns an ordinal number according to connection sequence thereof. The operating method includes steps as follows. First, the controller 20 defines the ordinal number of the LED modules 10 which need to be changed their light modes as a target number, and sequentially transmits a plurality of light data whose number is greater than or equal to the target number to each of the LED modules 10 (S10). The LED modules have physical electrical connections when the LED modules 10 are assembled, but the LED modules 10 have not been numbered. Therefore, the LED drive apparatuses with burning function 12 are used to burn the ordinal number to number the LED modules 10 so that the sequence of the LED modules 10 of the assembled pixel-controlled LED light string 100 is clearly defined. For example, it is assumed that the number of the LED modules 10 is 50 and the 50 LED modules 10 are connected in series. Therefore, the ordinal number of the LED drive apparatus 12 of the 1st LED module 10 is 1, the ordinal number of the LED drive apparatus 12 of the 2nd LED module 10 is 2, and so on. Finally, the ordinal number of the LED drive apparatus 12 of the 50th LED module 10 is 50. Accordingly, each LED module 10 has its own unique identification ordinal number after the ordinal numbers of the LED modules 10 are defined.

Afterward, the LED drive apparatuses 12 sequentially receive each of the light data and count sequence of the light data (S20). The controller 20 sequentially transmits the plurality of light data whose number is greater than the target number to each of the LED modules 10 such as that the controller 20 sequentially transmits the plurality of light data whose number is equal to the number of the LED modules 10. Alternatively, the controller 20 sequentially transmits the plurality of light data whose number is equal to the target number to each of the LED modules 10 such as that the controller 20 sequentially transmits the plurality of light data whose number is the maximum ordinal number of the LED modules 10 that need to be changed their light modes. The light data has an end code or has a start code and an end code as a mark for determining the end or start of the light data. Therefore, the controller 20 transmits the plurality of light data to control the LEDs 11 in one or more LED modules 10 to change their light modes.

Afterward, if the sequence of the light data meets (is equal to) the ordinal number of the LED drive apparatus 12, the LED drive apparatuses 12 identify the light data (S30). Finally, after identifying the light data, the LED drive apparatuses 12 control the corresponding LEDs 11 (S40). The LED modules 10 perform light operations according to the received light data. Accordingly, the burning manner without address data can be realized, and the LEDs 11 of the LED modules 10 can be also correctly controlled.

In conclusion, the present disclosure has following features and advantages:

1. The LED modules have physical electrical connections when the LED modules 10 are assembled and the LED drive apparatuses with burning function 12 are used to burn the ordinal number to number the LED modules 10 so that the sequence of the LED modules 10 of the assembled pixel-controlled LED light string 100 is clearly defined.

2. The burning manner without address data can be realized by counting the ordinal number to acquire the light data so that the LEDs 11 of the LED modules 10 can be also correctly controlled.

3. The number of the light data transmitted by the controller 20 is equal to the maximum ordinal number of the LEDs 11 in the LED module 10 that need to be changed their light modes, thereby reducing the data amount of the light data.

4. Two-wire and three-wire LED modules can be used to increase the adaption, diversification, and flexibility of the pixel-controlled LED light string.

Figure 6:
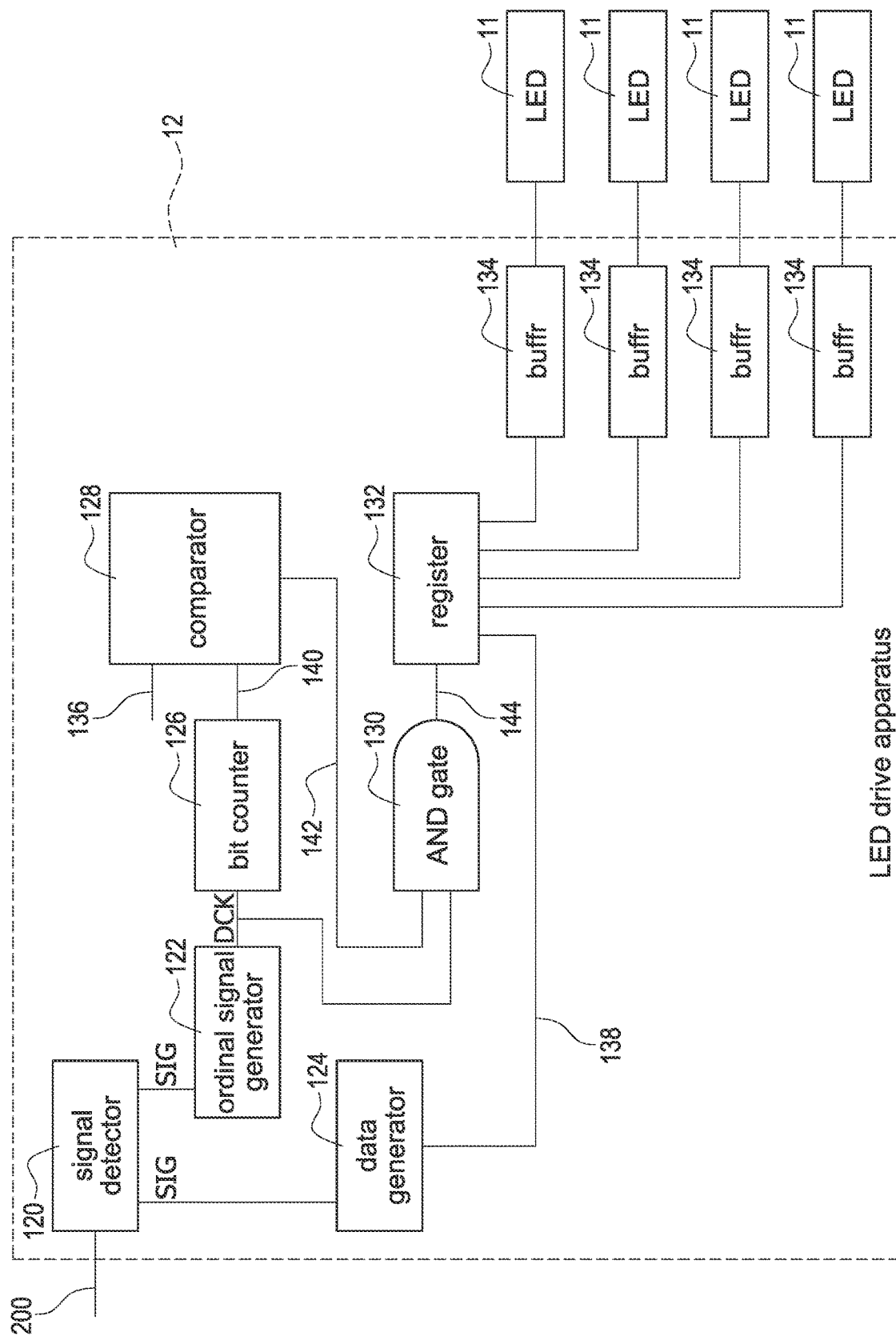
FIG. 6 shows a block diagram of an embodiment of the LED drive apparatus of the present disclosure.
Figure 7:
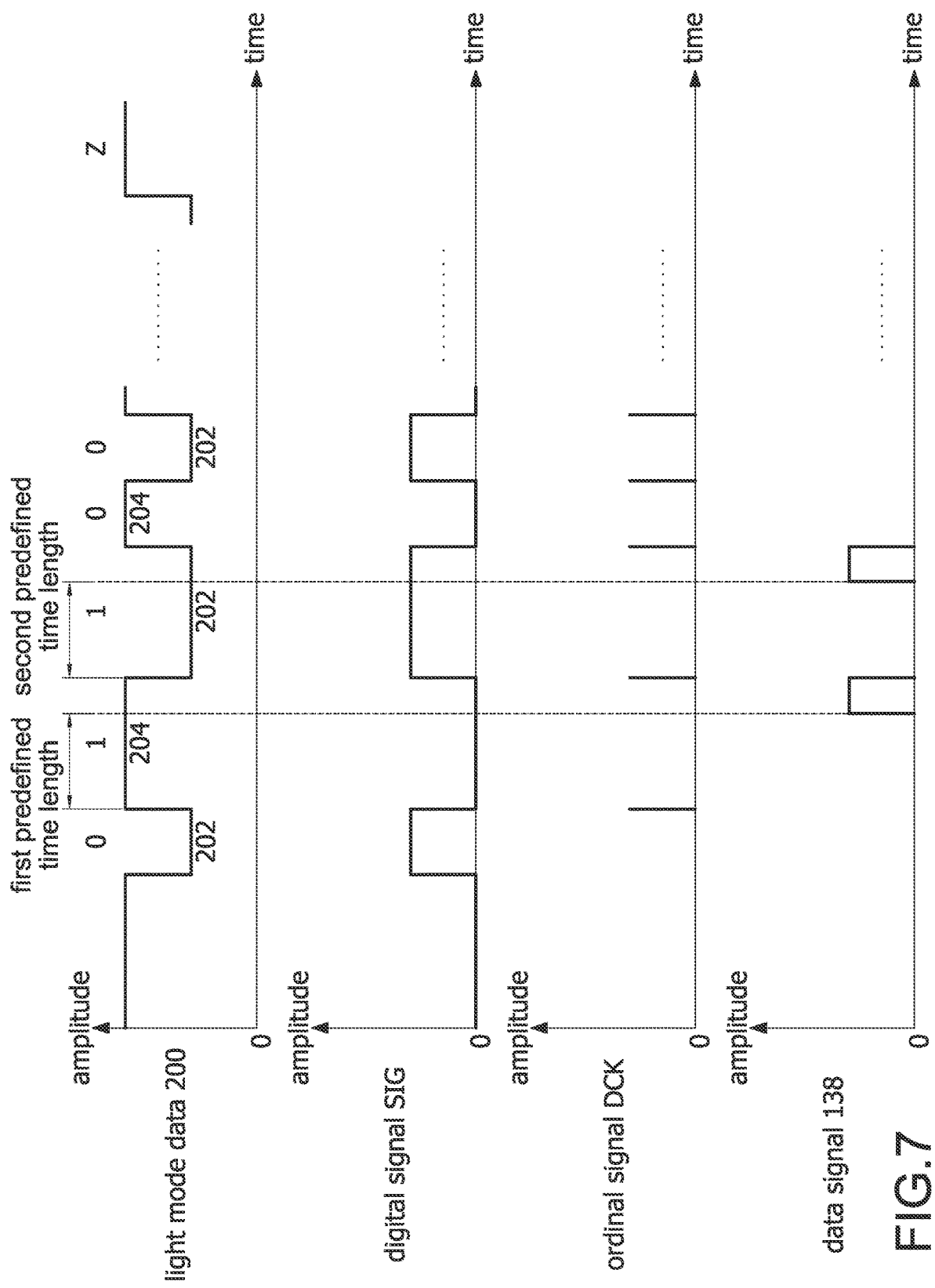
FIG. 7 shows waveform diagrams of the present disclosure.

FIG. 6 shows a block diagram of an embodiment of the LED drive apparatus of the present disclosure while FIG. 7 shows waveform diagrams of the present disclosure. The LED drive apparatus 12 includes a signal detector 120, an ordinal signal generator 122, a data generator 124, a bit counter 126, a comparator 128, an AND gate 130, a register 132 and a plurality of buffers 134; the components mentioned above are electrically connected to each other. In FIG. 7, from top to bottom the first waveform diagram is for the light data 200. The light data 200 includes a plurality of first level voltage signals 202 and a plurality of second level voltage signals 204. When the LED drive apparatus 12 receives the light data 200, the LED drive apparatus 12 is configured to calculate a first time length of the first level voltage signal 202 and a second time length of the second level voltage signal 204; the LED drive apparatus 12 is configured to identify the first level voltage signal 202 as a first value if the first time length is greater than a first predefined time length, and as a second value if the first time length is less than or equal to the first predefined time length; the LED drive apparatus 12 is configured to identify the second level voltage signal 204 as the first value if the second time length is greater than a second predefined time length, and as the second value if the second time length is less than or equal to the second predefined time length; the first predefined time length may be equal to the second predefined time length, or the first predefined time length may be different (namely, longer or shorter) from the second predefined time length. Moreover, the light data 200 has the end code Z.

Moreover, the first level voltage signal 202 may be lower or higher than the second level voltage signal 204; the first value is data 0 while the second value is data 1, or the first value is data 1 while the second value is data 0. In FIG. 7, the first level voltage signal 202 is lower than the second level voltage signal 204, the first value is data 0 while the second value is data 1, so that data 01100 are identified. Namely, no matter it is the first level voltage signal 202 or the second level voltage signal 204, as long as its time length is shorter, it is data 0, while as long as its time length is longer it is data 1.

Moreover, the signal detector 120 is, for example but not limited to, an analog-to-digital converter, configured to receive the light data 200 which is an analog signal, to convert the light data 200 into a digital signal SIG (in FIG. 7, from top to bottom the second waveform diagram) and to transmit the digital signal SIG to the ordinal signal generator 122 and the data generator 124. Please note that in this embodiment, the first level voltage signal 202 becomes a signal which is higher than that of the second level voltage signal 204, but the present disclosure is not limited to it; namely, the first level voltage signal 202 may still become lower than the second level voltage signal 204.

Moreover, the ordinal signal generator 122 is configured to convert the digital signal SIG into an ordinal signal DCK (in FIG. 7, from top to bottom the third waveform diagram) and to transmit the ordinal signal DCK to the bit counter 126 and the AND gate 130; if there is a rising edge or a falling edge in the digital signal SIG, there is a corresponding signal in the ordinal signal DCK; many circuits or components can convert the digital signal SIG into the ordinal signal DCK, such as an edge signal generator. The data generator 124 is configured to convert the digital signal SIG into a data signal 138 (in FIG. 7, from top to bottom the fourth waveform diagram) and to transmit the data signal 138 to the register 132; if there is a data 1, there is a corresponding signal in the data signal 138; many circuits or components can convert the digital signal SIG into the data signal 138, such as a pulse signal generator.

Moreover, based on the ordinal number 136 of the LED drive apparatuses 12 and the data signal 138, the LED drive apparatuses 12 is configured to utilize the bit counter 126, the comparator 128, the AND gate 130, the register 132 and the buffers 134 to drive the at least one LED 11, which is already described in details from above. Namely, the bit counter 126 is configured to count the ordinal signal DCK to obtain a bit counting signal 140 and to transmit the bit counting signal 140 to the comparator 128. The comparator 128 is configured to compare the bit counting signal 140 with the ordinal number 136 to obtain a local ordinal timing signal 142 and to transmit the local ordinal timing signal 142 to the AND gate 130. The AND gate 130 is configured to perform an AND gate function on the ordinal signal DCK and the local ordinal timing signal 142 to obtain a local ordinal lighting signal 144 and to transmit the local ordinal lighting signal 144 to the register 132. Based on the local ordinal lighting signal 144 and the data signal 138, the register 132 is configured to drive the at least one LED 11 through the buffers 134.

Figure 8:
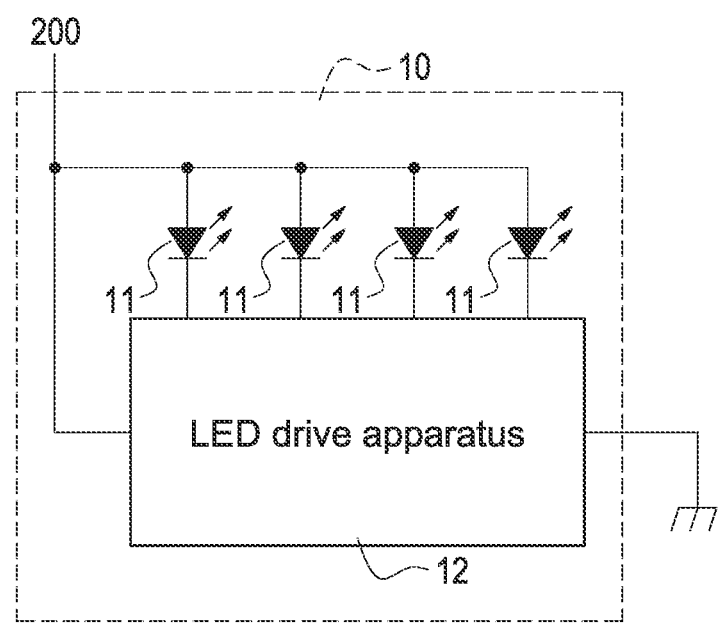
FIG. 8 shows a block diagram of an embodiment of the LED module of the present disclosure.
Figure 9:
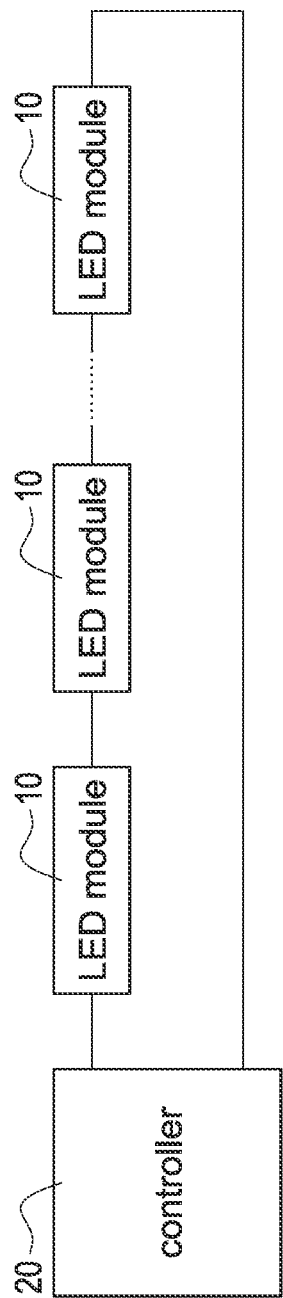
FIG. 9 shows the series string of the present disclosure.
Figure 10:
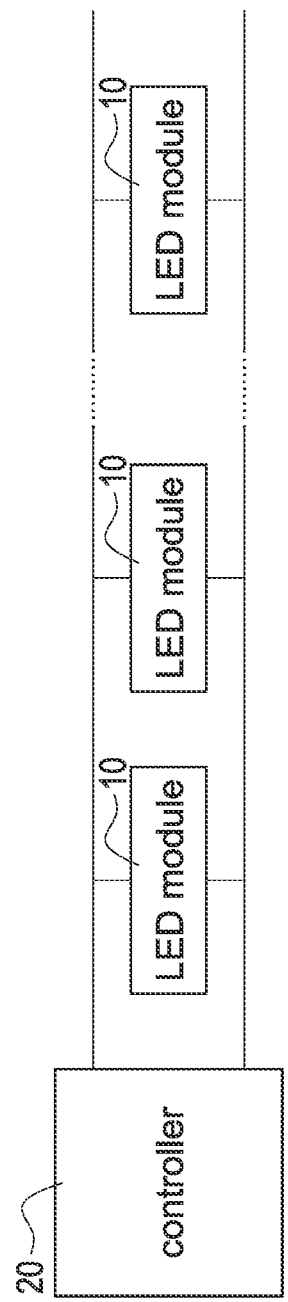
FIG. 10 shows the parallel string of the present disclosure.

FIG. 8 shows a block diagram of an embodiment of the LED module of the present disclosure. FIG. 9 shows the series string of the present disclosure. FIG. 10 shows the parallel string of the present disclosure. The present disclosure can be applied to the series string and the parallel string. If the present disclosure is applied to the series string, the first LED module 10 receives the light data 200 from the controller 20 and transmits the light data 200 to the second LED module 10 through the ground of the first LED module 10, the second LED module 10 receives the light data 200 from the ground of the first LED module 10 and transmits the light data 200 to the third LED module 10 through the ground of the second LED module 10, and so on. If the present disclosure is applied to the parallel string, all of the LED modules 10 receive the light data 200 from the controller 20.

As mentioned above, the pixel-controlled LED light string is provided to realize the burning manner without address data only by counting the ordinal number to acquire the light data so that the LEDs of the LED modules can be also correctly controlled, which can save time (for example, up to 20%~24%) because there is no address data. Moreover, the related art uses only the high-level parts of the signals or the low-level parts of the signals to calculate data 0/1. However, according to the features of FIG. 6 and FIG. 7 mentioned above, the present disclosure can save time (for example, up to 40%~50%) because the features of FIG. 6 and FIG. 7 use both of the high-level parts of the signals and the low-level parts of the signals to calculate data 0/1.

Moreover, if the feature which is without address data and the features of FIG. 6 and FIG. 7 are both performed together, it can save more time (for example, up to 60%), which is the best method.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A pixel-controlled light emitting diode (LED) light string, comprising:
    a plurality of LED modules electrically connected to each other, each LED module comprising:
    at least one LED, and
    a LED drive apparatus with burning function coupled to the at least one LED and the LED drive apparatus configured to burn an ordinal number according to connection sequence of the LED drive apparatus, and
    a controller electrically connected to the LED modules, wherein the controller is configured to define the ordinal number of the LED module as a target number for changing a light mode of the LED module, and the controller sequentially transmits a plurality of light data whose number is greater than or equal to the target number to each of the LED modules,
    wherein each of the LED drive apparatuses is configured to sequentially receive each of the light data and count sequence of the light data, when the sequence of the light data is equal to the ordinal number of the LED drive apparatus, the LED drive apparatuses are configured to identify the light data, and after identifying the light data, the LED drive apparatuses are configured to control the corresponding at least one LED;
    wherein the light data comprises a plurality of first level voltage signals and a plurality of second level voltage signals; when the LED drive apparatus receives the light data, the LED drive apparatus is configured to calculate a first time length of the first level voltage signal and a second time length of the second level voltage signal;
    wherein the LED drive apparatus is configured to identify the first level voltage signal as a first value when the first time length is greater than a first predefined time length, and as a second value when the first time length is less than or equal to the first predefined time length;
    wherein the LED drive apparatus is configured to identify the second level voltage signal as the first value when the second time length is greater than a second predefined time length, and as the second value when the second time length is less than or equal to the second predefined time length.

2. The pixel-controlled LED light string in claim 1, wherein each LED module comprises:
    a positive power end and a negative power end, and
    a data signal end,
    wherein the data signal ends of the plurality of LED modules are configured to receive the plurality of light data,
    wherein the positive power ends of the plurality of LED modules are connected to each other and configured to receive a positive power provided from the controller,
    wherein the negative power ends of the plurality of LED modules are connected to each other and configured to receive a negative power provided from the controller.

3. The pixel-controlled LED light string in claim 1, wherein each LED module comprises:
    a positive power end and a negative power end, and
    a data signal end,
    wherein the data signal ends of the plurality of LED modules are configured to receive the plurality of light data,
    wherein the positive power end of the first LED module is configured to receive a positive power provided from the controller and the negative power end of the last LED module is configured to receive a negative power provided from the controller, and the remaining LED modules are coupled in series by connecting the positive power end of the latter to the negative power end of the former.

4. The pixel-controlled LED light string in claim 1, wherein the controller is configured to generate a working voltage and transmit the light data to each of the LED modules by changing magnitude of the working voltage.

5. The pixel-controlled LED light string in claim 2, wherein the controller is configured to control a voltage drop of the working voltage, wherein the working voltage is less than a low-level voltage, wherein the controller is configured to transmit the light data to the LED modules.

6. The pixel-controlled LED light string in claim 1, wherein the light data is a data number that is equal to the number of the LED modules.

7. The pixel-controlled LED light string in claim 1, wherein the light data is a data number that is equal to the maximum ordinal number of the LED modules whose light modes need to be changed.

8. The pixel-controlled LED light string in claim 1, wherein the LED modules whose light modes need to be changed are configured to receive different light data, the same light data, or a specific light data.

9. The pixel-controlled LED light string in claim 1, wherein the light data has an end code or has a start code and an end code; each of the LED drive apparatuses is burned by a contact burning or a non-contact burning; the first predefined time length is equal to the second predefined time length.

10. The pixel-controlled LED light string in claim 1, wherein the LED drive apparatus comprises:
    a signal detector;
    an ordinal signal generator electrically connected to the signal detector;
    a data generator electrically connected to the signal detector;
    a bit counter electrically connected to the ordinal signal generator;
    a comparator electrically connected to the bit counter;
    an AND gate electrically connected to the comparator and the data generator;
    a register electrically connected to the AND gate; and
    a plurality of buffers electrically connected to the register and the at least one LED.

11. A method of operating a pixel-controlled light emitting diode (LED) light string, the pixel-controlled LED light comprising a plurality of LED modules and a controller, wherein each LED module comprises at least one LED and a LED drive apparatus with burning function, and the LED drive apparatus is configured to burn an ordinal number according to connection sequence of the LED drive apparatus, the method comprising steps of:

defining, by the controller, the ordinal number of the LED modules as a target number for changing a light mode of the LED module, and sequentially transmitting, by the controller, a plurality of light data whose number is greater than or equal to the target number to each of the LED modules, sequentially receiving, by the LED drive apparatuses, each of the light data and counting sequence of the light data, identifying, by the LED drive apparatuses, the light data when the sequence of the light data is equal to the ordinal number of the LED drive apparatus, and controlling, by the LED drive apparatuses, the corresponding at least one LED, wherein the light data comprises a plurality of first level voltage signals and a plurality of second level voltage signals; when the LED drive apparatus receives the light data, the LED drive apparatus is configured to calculate a first time length of the first level voltage signal and a second time length of the second level voltage signal;

wherein the LED drive apparatus is configured to identify the first level voltage signal as a first value when the first time length is greater than a first predefined time length, and as a second value when the first time length is less than or equal to the first predefined time length;

wherein the LED drive apparatus is configured to identify the second level voltage signal as the first value when the second time length is greater than a second predefined time length, and as the second value when the second time length is less than or equal to the second predefined time length.

12. The method of operating the pixel-controlled LED light string in claim 11, wherein each LED module comprises:
a positive power end and a negative power end, and
a data signal end,
wherein the data signal ends of the plurality of LED modules are configured to receive the plurality of light data,
wherein the positive power ends of the plurality of LED modules are connected to each other and configured to receive a positive power provided from the controller,
wherein the negative power ends of the plurality of LED modules are connected to each other and configured to receive a negative power provided from the controller.

13. The method of operating the pixel-controlled LED light string in claim 11, wherein each LED module comprises:
a positive power end and a negative power end, and
a data signal end,
wherein the data signal ends of the plurality of LED modules are configured to receive the plurality of light data,
wherein the positive power end of the first LED module is configured to receive a positive power provided from the controller and the negative power end of the last LED module is configured to receive a negative power provided from the controller, and the remaining LED modules are coupled in series by connecting the positive power end of the latter to the negative power end of the former.

14. The method of operating the pixel-controlled LED light string in claim 11, wherein the controller is configured to generate a working voltage and transmit the light data to each of the LED modules by changing magnitude of the working voltage.

15. The method of operating the pixel-controlled LED light string in claim 11, wherein the controller is configured to control a voltage drop of the working voltage, wherein the working voltage is less than a low-level voltage, wherein the controller is configured to transmit the light data to the LED modules.

16. The method of operating the pixel-controlled LED light string in claim 11, wherein the light data is a data number that is equal to the number of the LED modules.

17. The method of operating the pixel-controlled LED light string in claim 11, wherein the light data is a data number that is equal to the maximum ordinal number of the LED modules whose light modes need to be changed.

18. The method of operating the pixel-controlled LED light string in claim 11, wherein the LED modules whose light modes need to be changed are configured to receive different light data, the same light data, or a specific light data.

19. The method of operating the pixel-controlled LED light string in claim 11, wherein the light data has an end code or has a start code and an end code; each of the LED drive apparatuses is burned by a contact burning or a non-contact burning; the first predefined time length is equal to the second predefined time length.

20. The method of operating the pixel-controlled LED light string in claim 11, wherein the LED drive apparatus comprises:
a signal detector;
an ordinal signal generator electrically connected to the signal detector;
a data generator electrically connected to the signal detector;
a bit counter electrically connected to the ordinal signal generator;
a comparator electrically connected to the bit counter;
an AND gate electrically connected to the comparator and the data generator;
a register electrically connected to the AND gate; and
a plurality of buffers electrically connected to the register and the at least one LED.

* * * * *